UNITED STATES PATENT OFFICE.

PIERRE FERRA, OF CALUIRE-ET-CUIRE, NEAR LYON, FRANCE.

PROCESS OF MAKING A COMPOSITION OF MATTER.

1,075,820.  Specification of Letters Patent.  Patented Oct. 14, 1913.

No Drawing.  Application filed June 10, 1912.  Serial No. 702,883.

*To all whom it may concern:*

Be it known that I, PIERRE FERRA, a citizen of the Republic of France, residing at Caluire-et-Cuire, near Lyon, France, have invented a new and useful Improved Process of Making a Composition of Matter, of which the following is a specification.

This invention relates to a new compound having a high thermal resistance and a low electric resistance. By reason of such physical qualities the compound is of utility for the manufacture of thermo-electric elements, and in its use for this purpose electric current is produced with efficiency by the application of heat.

The compound is also of advantage for use as an insulating material of heat or cold.

It is known to employ metallic sulfids and especially copper sulfid for molding and insulating purposes and they have also been proposed in conjunction with sulfur for the manufacture of thermo-electric elements; also an acid resisting composition of pyrites sulfur and sand has been proposed.

The invention has for its object to produce a composition of matter having a metallic a composition of matter having a metallic sulfid and especially copper sulfid cuprous or cupric as its base and to produce a compound that is homogeneous that has a substantially constant electro-motive force and that yields high efficiency in the development of electric current by the application of heat and which has an electrical resistance diminishing instead of increasing with the increase temperature.

I have found that by the addition of kaolin or of a substance having some of the characteristics of kaolin to a metallic sulfid and especially to copper sulfid, to which a quantity of sulfur is also added, a compound is produced that under practical conditions possesses a high degree of thermal resistance and a very low electric resistance.

It will be understood that the invention is not limited to any particular proportion of the respective substances. A proportion in the ultimate product of about 20% of sulfur, and a proportion of about from 1 to 2% of kaolin has been found effective.

The invention comprises a process for producing this compound, consisting in first melting the substances specified and cooling the liquid mass produced, crushing the product, and reducing it into the condition of fine powder. This fine powder is then compressed under pressure in molds or in envelops or casings, which conveniently may take the form of tubes, rectangular cases, etc. By such treatment a homogeneous, hard and refractory substance is produced, and when the mixture is compressed into envelops or casings complete contact of the substance with the envelops or casings results.

After compression the compound is heated to about 800° C. which has to be done in a closed vessel and by which it is further indurated and rendered ready for use.

In carrying the process into effect, by way of example I take 25 to 30 parts of sulfur with about from 1 to 2 parts of kaolin and I melt the mixture of sulfur and kaolin with about 78 to 80 parts of copper sulfid in a covered crucible until about 20% or parts of sulfur remains, I then allow the molten mass to cool. I then reduce it to the condition of fine powder and subject it to pressure as described.

As to its uses: The compound may generally be used as a heat insulating material, for example, as a covering for boilers and steam pipes, and for the interior of safes, and refrigerating apparatus and the like. It may be also used for the purpose of the production of electric current by the application of heat.

It will thus be understood that the invention is not limited to any particular use or application of the compound, nor yet is it limited to any particular method of preparation.

In the manufacture of the compound, instead of kaolin, quartz in a fine condition, sand, clay, or any other substance having the characteristics of kaolin may be employed, while cupric sulfid may be substituted in some cases for the cuprous sulfid which I prefer.

I claim:

A process for the production of a novel composition of matter, consisting in melting together a mixture of a metallic sulfid with sulfur and a substance having the characteristics of kaolin, cooling the resulting molten mass until solidified, reducing the solidified compound to a fine powder, compressing the said powder in molds, and subjecting the compressed compound material to a high temperature in a closed vessel.

PIERRE FERRA.

Witnesses:
 EDOUARD JUVANOT,
 FRANÇAIS DUBASTE.